US011463911B2

(12) United States Patent
Arnold et al.

(10) Patent No.: US 11,463,911 B2
(45) Date of Patent: Oct. 4, 2022

(54) TECHNIQUES FOR CONTROLLING COMPUTATIONAL RESOURCES OF A RADIO ACCESS NETWORK

(71) Applicant: Deutsche Telekom AG, Bonn (DE)

(72) Inventors: Paul Arnold, Frankfurt am Main (DE); Michael Einhaus, Leipzig (DE); Gerd Zimmermann, Weiterstadt (DE); Igor Kim, Leipzig (DE); Mohamad Buchr Charaf, Leipzig (DE)

(73) Assignee: DEUTSCHE TELEKOM AG, Bonn (DE)

( * ) Notice: Subject to any disclaimer, the term of this patent is extended or adjusted under 35 U.S.C. 154(b) by 7 days.

(21) Appl. No.: 17/251,290

(22) PCT Filed: Jun. 3, 2019

(86) PCT No.: PCT/EP2019/064333
§ 371 (c)(1),
(2) Date: Dec. 11, 2020

(87) PCT Pub. No.: WO2019/238455
PCT Pub. Date: Dec. 19, 2019

(65) Prior Publication Data
US 2021/0168653 A1 Jun. 3, 2021

(30) Foreign Application Priority Data
Jun. 15, 2018 (EP) .................................. 18177990

(51) Int. Cl.
*H04W 28/08* (2009.01)
*H04W 28/16* (2009.01)
(Continued)

(52) U.S. Cl.
CPC ... *H04W 28/0808* (2020.05); *H04W 28/0933* (2020.05); *H04W 28/16* (2013.01); *H04W 72/0493* (2013.01); *H04W 88/085* (2013.01)

(58) Field of Classification Search
CPC ......... H04W 28/0808; H04W 28/0933; H04W 28/16; H04W 72/0493; H04W 88/085
See application file for complete search history.

(56) References Cited

U.S. PATENT DOCUMENTS

2014/0053151 A1* 2/2014 Heninger .............. G06F 9/5077
718/1
2015/0295791 A1* 10/2015 Cropper .............. H04L 41/0896
709/226
(Continued)

OTHER PUBLICATIONS

3rd Generation Partnership Project, 3GPP TR 38.806 V15.0.0, 3rd Generation Partnership Project; Technical Specification Group Radio Access Network; Study of separation of NR Control Plane (CP) and User Plane (UP) for split option 2, Dec. 2017, pp. 1-22, Release 15, 3rd Generation Partnership Project, Valbonne, France.
(Continued)

*Primary Examiner* — Robert C Scheibel
(74) *Attorney, Agent, or Firm* — Leydig, Voit & Mayer, Ltd.

(57) ABSTRACT

A radio access system includes: a set of radio access entities, in particular a set of gNBs and/or ng-eNBs, which are interconnected via respective first interfaces; and a centralized resource controller. Each radio access entity of the set of radio access entities comprises a centralized unit (CU) and at least one distributed unit (DU) coupled to the CU via a second interface. The centralized resource controller configured to assign computational resources to the CUs and the DUs of the radio access entities based on measurement reports received via the first interfaces and/or the second interfaces from the respective units, wherein the measure-
(Continued)

ment reports comprise information about a computational resource utilization of the respective units.

15 Claims, 8 Drawing Sheets

(51) Int. Cl.
*H04W 72/04* (2009.01)
*H04W 88/08* (2009.01)

(56) References Cited

U.S. PATENT DOCUMENTS

| | | | | |
|---|---|---|---|---|
| 2019/0174342 | A1* | 6/2019 | Yokoyama | H04L 43/0894 |
| 2020/0334065 | A1* | 10/2020 | Wang | G06F 9/52 |
| 2021/0195467 | A1* | 6/2021 | Xia | H04W 24/02 |
| 2021/0219197 | A1* | 7/2021 | Prasad | H04W 36/245 |

OTHER PUBLICATIONS

Satendra Sahu, et al., "A Demand Based Resource Provisioner for Cloud Infrastructure", Smart Innovation Systems and Technologies, Jun. 26, 2014, pp. 425-426, vol. 28, Springer, New Delhi, India.
$3^{rd}$ Generation Partnership Project, 3GPP TS 38.401 V15.1.0, $3^{rd}$ Generation Partnership Project; Technical Specification Group Radio Access Network; NG-RAN; Architecture description, Mar. 2018, pp. 1-23, Release 15), $3^{rd}$ Generation Partnership Project, Valbonne, France.

* cited by examiner

TECHNIQUES FOR CONTROLLING COMPUTATIONAL RESOURCES OF A RADIO ACCESS NETWORK

CROSS-REFERENCE TO PRIOR APPLICATIONS

This application is a U.S. National Phase Application under 35 U.S.C. § 371 of International Application No. PCT/EP2019/064333, filed on Jun. 3, 2019, and claims benefit to European Patent Application No. EP 18177990.1, filed on Jun. 15, 2018. The International Application was published in English on Dec. 19, 2019 as WO 2019/238455 A1 under PCT Article 21(2).

TECHNICAL FIELD

The disclosure relates to techniques for controlling computational resources of a radio access network or system, in particular a 5G NR (new radio) radio access network (RAN). The disclosure further relates to an enhanced F1/Xn/NG interface to introduce a new dimension of KPIs (key performance indicators) regarding computational resources in a 5G RAN within and among gNBs.

BACKGROUND

A conventional 4G radio access network (RAN) consists of dedicated hardware which is dimensioned for providing maximum performance depending on a multitude of parameters such as maximum number of supported spatial transmission layers in case of MIMO (multiple input multiple output), supported subsets of modulation and coding schemes, allocated bandwidth, etc. The new 5G RAN (also called NG-RAN, next generation RAN) architecture, e.g. as illustrated in FIG. 1, can be operated in a telco cloud environment where the functionality of individual network entities are basically decoupled from the hardware and software that provides the computational resources via virtualization. Based on the concept of virtualization, individual network functions within the RAN can be moved to telco cloud environments where computational resources are dynamically shared between network functions in order to increase energy efficiency and flexibility. The 5G RAN architecture will thereby most likely utilize a distributed cloud environment including centralized clouds and edge clouds. The latter are also known as mobile edge clouds in the context of mobile radio networks.

The RAN protocol stack may be deployed virtualized in a telco cloud environment (cloud RAN). Even different network functions, such as the mobility management, resource scheduling, etc. for special service types, such as V2X (vehicle-to-anything), or a different application may run and share with each other the same hardware resources. The gNB 220 within the 5G RAN may include a centralized unit (CU) 221 and one or more distributed units (DUs) 222, 223, as illustrated in FIG. 2. Each of these units requires a certain amount of computational resources (i.e. CPU quota, memory, etc.), depending on the performed function and the inherent complexity of it.

SUMMARY

In an exemplary embodiment, the present invention provides a radio access system, including: a set of radio access entities, in particular a set of gNBs and/or ng-eNBs, which are interconnected via respective first interfaces, wherein each radio access entity of the set of radio access entities comprises a centralized unit (CU) and at least one distributed unit (DU) coupled to the CU via a second interface; and a centralized resource controller configured to assign computational resources to the CUs and the DUs of the radio access entities based on measurement reports received via the first interfaces and/or the second interfaces from the respective units, wherein the measurement reports comprise information about a computational resource utilization of the respective units.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
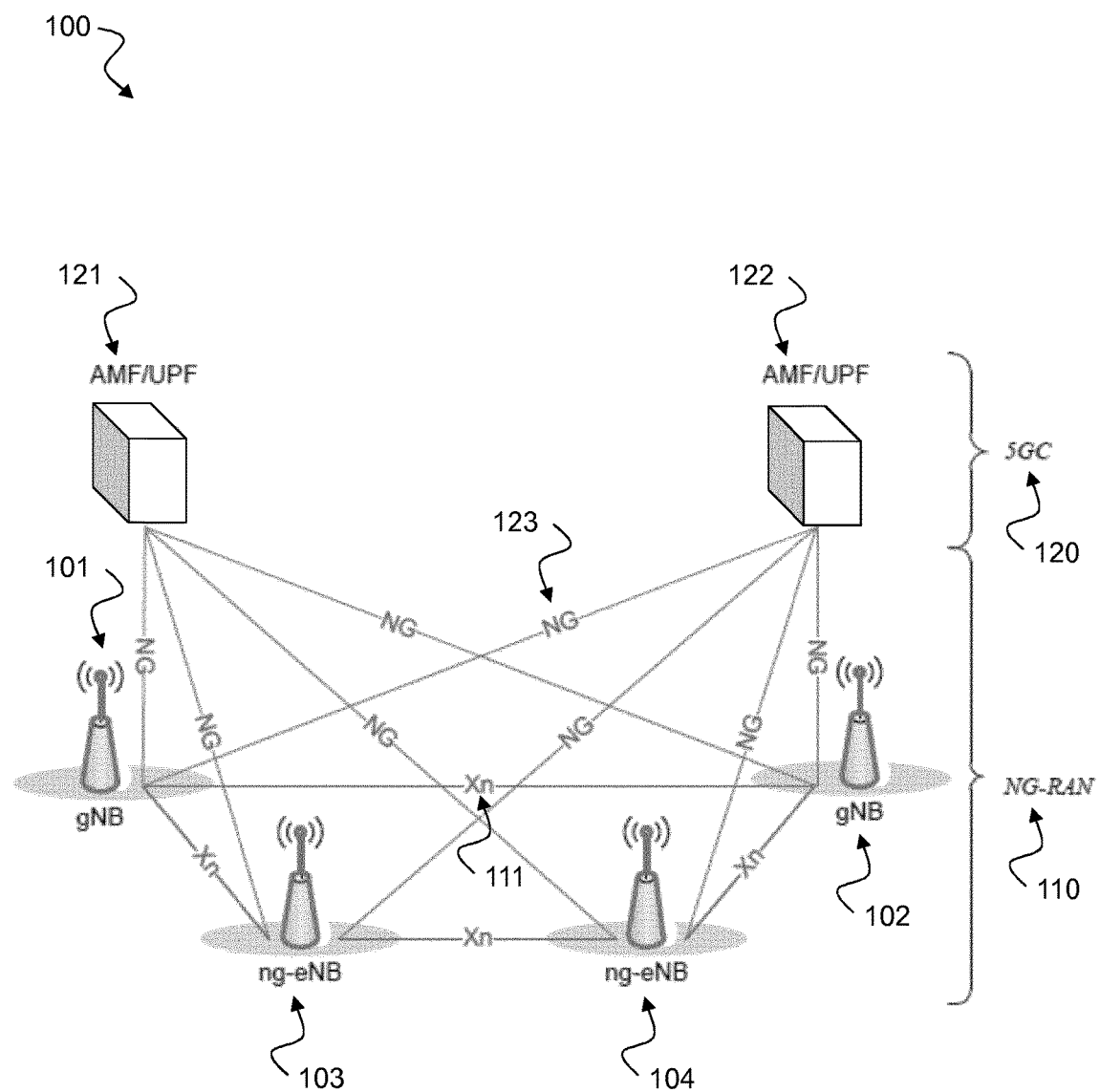
FIG. 1 shows an overall architecture of a 5G radio access network (RAN) 100.

Exemplary embodiments of the present invention provide for efficiently exploiting the computational resources in a radio access network, in particular in a NG-RAN or 5G RAN.

Exemplary embodiments of the present invention control the computational resources for DUs and CUs within the telco clouds via corresponding resource controllers. That means that resource control algorithms are provided with information about the corresponding requirements of the DUs and CUs. Novel algorithms are introduced considering both resource types while providing graceful degradation of the user performance.

The devices, methods and systems presented below may be of various types. The individual elements described may be realized by hardware or software components, for example electronic components that can be manufactured by various technologies and include, for example, semiconductor chips, application-specific integrated circuits (ASICs), microprocessors, digital signal processors, integrated electrical circuits, electro-optical circuits and/or passive components.

According to a first aspect the invention relates to a radio access system, comprising: a set of radio access entities, in particular a set of gNBs and/or ng-eNBs, which are interconnected via respective first interfaces (Xn-C), wherein each radio access entity of the set of radio access entities comprises a centralized unit (CU), and at least one distributed unit (DU) coupled to the CU via a second interface (F1); and a centralized resource controller configured to assign computational resources to the CU and the at least one DU of the radio access entities based on measurement reports received via the first interfaces (Xn-C) and/or the second interfaces (F1) from the respective units, wherein the measurement reports comprise information about a computational resource utilization of the respective units.

The centralized resource controller can efficiently control the computational resources for the DUs and CUs within the telco clouds. Via the first and second interfaces of the radio access system the centralized resource controller can be provided with information about the corresponding requirements of the DUs and CUs in order to efficiently control the computational resources and hence provide graceful degradation of the user performance if necessary. Hence, the computational resources in the radio access network, e.g. a NG-RAN or 5G RAN, can be efficiently exploited.

In an exemplary implementation form of the radio access system, the first interfaces are implemented as Xn-C interfaces between the gNBs and/or ng-eNBs according to a 5G Radio Access Network architecture; and the second interfaces are implemented as F1 interfaces between a respective CU and corresponding DUs according to the 5G Radio Access Network architecture.

This provides the advantage that exemplary embodiments of the present invention can be advantageously applied in a 5G RAN architecture and are thus compliant with the 5G NR standards.

In an exemplary implementation form of the radio access system, the centralized resource controller is placed at a master gNB or at one of the CUs of the radio access system.

This provides the advantage that computational resources for the whole radio access network can be controlled by a single central entity which saves resources and reduces signaling flows. The system provides enough flexibility to place the centralized resource controller at the master gNB or at any one of the CUs.

In an exemplary implementation form of the radio access system, the CUs and DUs comprise respective measurement modules configured to measure the computational resource utilization of the respective units and to transmit the measurement reports to the centralized resource controller.

This provides the advantage that a decentralized architecture can be implemented in which measurement results are generated at the respective units which computational resources are determined. This facilitates the system architecture and improves accuracy of the measurements.

In an exemplary implementation form of the radio access system, the centralized resource controller is configured to perform radio resource coordination and/or load balancing based on the information about computational resource utilization comprised in the measurement reports.

This provides the advantage that accuracy of radio resource coordination and load balancing can be improved since information about computational complexity of the different units is provided to the controller.

In an exemplary implementation form of the radio access system, the centralized resource controller is configured to perform X2 application protocol functions and/or Xn application protocol functions based on the information about computational resource utilization comprised in the measurement reports.

The X2AP protocol is used to handle the UE mobility within E-UTRAN and provides the following functions: Mobility Management, Load Management, Reporting of General Error Situations, Resetting the X2, Setting up the X2 and eNB Configuration Update.

XnAP is the control protocol used between gNBs to support a variety of RAN related procedures, such as establishing Dual Connectivity, coordination of Xn based handovers, data forwarding and RAN Paging. During the handover process, the source gNB will provide the target gNB with all the necessary information it needs to handle the subscriber, including security and User Plane connectivity information. For Dual Connectivity, the Master gNB will use XnAP to set up a Secondary gNB, with each gNB serving the user simultaneously.

When these application protocols are provided with the information about computational resource utilization of the respective units, the accuracy of the application protocols can be improved.

In an exemplary implementation form of the radio access system, the measurement reports are specified as bitmaps comprising the following information elements: CPU utilization information, memory utilization information, network interface utilization information, storage utilization information.

This provides the advantage that these bitmaps are compliant with the 5G RAN standard and can be applied in standard compliant systems, thereby improving operation of the NG-RAN by exploiting additional computational resource information such as CPU utilization information, memory utilization information, network interface utilization information and storage utilization information.

In an exemplary implementation form of the radio access system, the measurement reports comprise the following header information: unique identifier of reporting radio access entity, identifier or location of reporting CU or DU, identifier of function to which the computational resources are assigned, measurement time window, time stamp of measurement.

This provides the advantage that the centralized resource controller can easily identify the corresponding unit to which the measurement report is assigned to. This facilitates processing of the centralized resource controller.

In an exemplary implementation form of the radio access system, each radio access entity of the set of radio access entities comprises a computational elasticity data base (CEDB) coupled via a computational elasticity control (CE-C) interface to the CU of the respective radio access entity, the CEDB providing a common data base for the computational resource utilization of the CU and DUs of the respective radio access entity.

This provides the advantage that each radio access entity has information available about current and past computational resources and thus can quickly reply to a request for computational resources from the centralized resource controller.

In an exemplary implementation form of the radio access system, the CEDB is configured to store the measurement reports for the CU and DUs of the respective radio access entity; and the centralized resource controller is configured to assign the computational resources based on accessing the measurement reports from the CEDB.

This provides the advantage that flexible methods for reporting measurements can be provided. For example, periodic reporting where measurement reports are transmitted at periodic time intervals from CEDB to the centralized resource controller or non-periodic reporting where measurement reports are transmitted upon request of the centralized resource controller.

In an exemplary implementation form of the radio access system, the CU of a radio access entity comprises a central Control Plane entity (CU-CP), and a central User Plane entity (CU-UP).

This provides the advantage that the CU-CP, the CU-UP and the DU can represent logical entities, e.g. entities which may be deployed at different physical sites. This improves the flexibility of the whole system.

In an exemplary implementation form of the radio access system, the CU-CP is configured to receive the measurement reports from the CU-UP and the at least one DU and to forward the measurement reports via the first interface (Xn-C).

This provides the advantage that a variety of measurement points can be installed at the respective CU-CP, CU-UP and DU units thereby improving measurement accuracy and system flexibility.

The separation of CU-CP and CU-UP provides the following benefits:
  Flexibility to operate and manage complex networks, supporting different network topologies, resources, and new service requirements;
  Alignment with SDN concept that would result in a functional decomposition of the radio access, based on a partial de-coupled architecture, between user and control plane entities and on network abstractions;
  For functions purely handling with CP or UP processes, independent scaling and realization for control and user plane functions operation;
  Support of multi-vendor interoperability (e.g., CU-CP and CU-UP can be provided by different vendors).
  The gNB deployment with separate CU-CP and CU-UP provides the possibility of optimizing the location of different RAN functions based on the scenario and desired performance. For example, the CU-CP can be placed in a location close to the DU to provide short latency for the critical CP procedures. The CU-UP can be centralized in a regional or national data center, thus favoring cloud implementation. An additional CU-UP can also be placed closer to the DU to provide a local termination point for URLLC traffic.
  Support of radio resource isolation and improving resource utilization for network slicing. A slicing instance may cover a geographic area of several ten to several hundred of gNBs. Central RRM may provide slice-level isolation as well as improve resource utilization.

In an exemplary implementation form of the radio access system, in a first configuration of the radio access entity, the CU-CP is centralized to coordinate operation of several DUs of the radio access entity and the CU-UP is centralized to provide a central termination point for user plane traffic; in a second configuration of the radio access entity, the CU-CP is co-located with a DU of the radio access entity to supervise an operation of the DU and the CU-UP is centralized to provide a central termination point for user plane traffic; and in a third configuration of the radio access entity, the CU-CP is centralized to coordinate operation of several DUs of the radio access entity and the CU-UP is distributed and co-located with a single DU of the radio access entity.

The first configuration according to the Centralized CU-CP scenario provides efficient load balancing and radio coordination of several DUs. This scenario allows to take maximum advantage of cloud technologies because both the CU-CP and CU-UP can be implemented in a virtualized environment. For the case where both CU-CP and CU-UP are deployed within the same physical node(s), the signaling over the E1 interface may be internal to the gNB and will thus not flow over the transport network, thereby reducing load on the transport network.

The second configuration according to the CU-CP distributed and CU-UP centralized scenario allows to take advantage of cloud technologies for user plane functions while ensuring low latency for critical control plane procedures. E1 signaling between the local Control and the User Plane function can flow over the transport network, e.g., between the distributed entity and the data center.

The third configuration according to the Centralized CU-CP scenario provides efficient load balancing and radio coordination of several DUs. This scenario also allows to take advantage of cloud technologies while ensuring low latency for user plane traffic, which is important for some applications (e.g., critical MTC).

In an exemplary implementation form of the radio access system, the centralized resource controller is configured to adjust a configuration of the radio access entity to one of the first configuration, the second configuration or the third configuration based on the measurement reports.

This provides the advantage that the above three scenarios according to the respective configurations can be efficiently exploited thereby saving computational resources of the whole system.

According to a second aspect, the invention relates to a method for controlling computational resources of a radio access system, comprising a set of radio access entities, in particular a set of gNBs and/or ng-eNBs, which are interconnected via respective first interfaces (Xn-C), wherein each radio access entity of the set of radio access entities comprises a centralized unit, CU, and at least one distributed unit, DU, coupled to the CU via a second interface (F1), wherein the method comprises: receiving measurement reports via the first interfaces (Xn-C) and/or the second interfaces (F1) from the CU and the at least one DU of the radio access entities, wherein the measurement reports comprise information about a computational resource utilization of the respective units; and assigning computational resources to the CU and the at least one DU of the radio access entities based on the measurement reports.

Applying such a method can efficiently control the computational resources for the DUs and CUs within the telco clouds. Via the first and second interfaces of the radio access system, information about the corresponding requirements of the DUs and CUs can be provided in order to efficiently control the computational resources and hence provide graceful degradation of the user performance if necessary. Hence, the computational resources in the radio access network, e.g. a NG-RAN or 5G RAN, can be efficiently exploited.

According to a third aspect, the invention relates to a computer readable non-transitory medium on which computer instructions are stored which, when executed by a computer, cause the computer to perform the method according to the second aspect of the invention.

According to a fourth aspect the invention relates to a computer program product comprising program code for performing the method according to the second aspect of the invention, when executed on a computer or a processor.

Embodiments of the invention can be implemented in hardware and/or software.

The following acronyms are applied in this disclosure:
DU: distributed unit
CU: centralized unit
RAN: radio access network (also referred to as radio access system)
NG-RAN: Next Generation RAN or 5G RAN
UE: user equipment
AMF: Access and mobility management function
UPF: user plane function
gNB: a node (in 5G terminology) providing NR user plane and control plane protocol terminations towards the UE
ng-eNB: a node (in 5G terminology) providing E-UTRA user plane and control plane protocol terminations towards the UE
CEDB: computational elasticity data base In the following detailed description, reference is made to the accompanying drawings, which form part of the disclosure, and in which are shown, by way of illustration, exemplary aspects in which the present invention may be placed. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

FIG. 1 shows an overall architecture of a 5G radio access network (RAN) 100. According to the definitions of the standard 3GPP TS 38.300 (V15.0.0), an NG-RAN node is either: a gNB, providing NR user plane and control plane protocol terminations towards the UE; or an ng-eNB, providing E-UTRA user plane and control plane protocol terminations towards the UE. The gNBs 101, 102 and ng-eNBs 103, 104 are interconnected with each other via the Xn interface 111. The gNBs 101, 102 and ng-eNBs 103, 104 are also connected via the NG interfaces 123 to the 5GC (5G core network) 120, more specifically to the AMF (Access and Mobility Management Function) 121, 122 via the NG-C interface and to the UPF (User Plane Function) 131, 132 via the NG-U interface.

The gNB 101, 102 and ng-eNB 103, 104 host the following functions: Functions for Radio Resource Management: Radio Bearer Control, Radio Admission Control, Connection Mobility Control, Dynamic allocation of resources to UEs in both uplink and downlink (scheduling); IP header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (originated from the AMF or O&M); Measurement and measurement reporting configuration for mobility and scheduling; Transport level packet marking in the uplink; Session Management; Support of Network Slicing; QoS Flow management and mapping to data radio bearers; Support of UEs in RRC_INACTIVE state; Distribution function for NAS messages; Radio access network sharing; Dual Connectivity; Tight interworking between NR and E-UTRA.

Figure 2:
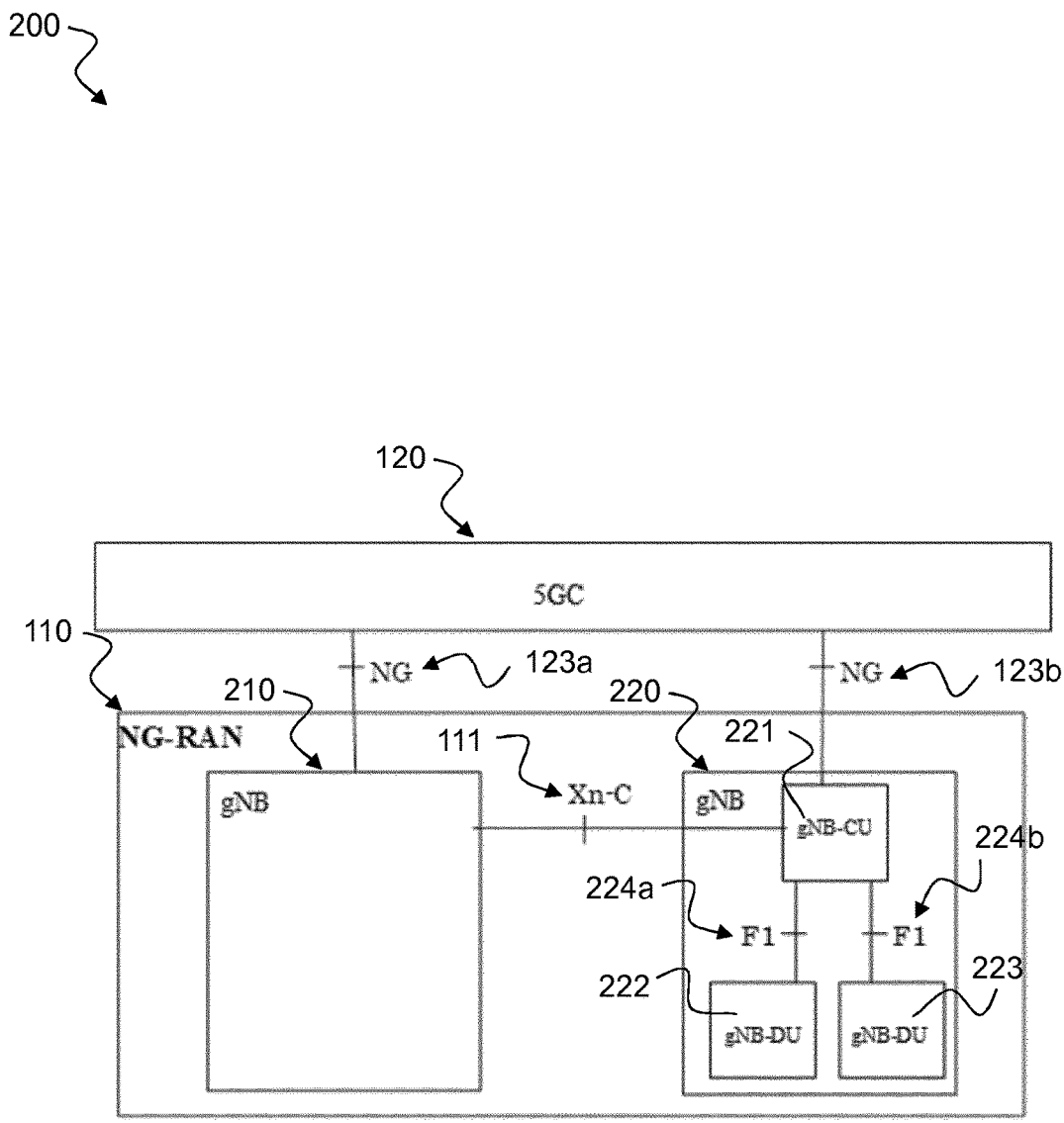
FIG. 2 shows an overall architecture of a 5G radio access network (RAN) 200 with details of a gNB 220 according to the disclosure.

FIG. 2 shows an overall architecture of a 5G radio access network (RAN) 200 with details of the gNB 220 according to the disclosure. The architecture and the F1 interface for a functional split of the gNB 200 are defined in 3GPP TS 38.401 (V15.0.0).

The gNB 220, 210 within the 5G RAN 110 may include a centralized unit (CU) 221 and one or more distributed units (DUs) 222, 223, as depicted in FIG. 2. Each of these units requires a certain amount of computational resources (CPU quota, memory, etc.), depending on the performed function and the inherent complexity of it. The computational resources for DUs 222, 223 and CUs 221 will therefore be controlled within the telco clouds via corresponding resource controllers. That means that these algorithms have to be aware of the corresponding requirements of the DUs 222, 223 and CUs 221. In this disclosure, novel algorithms are introduced considering both resource types while providing graceful degradation of the user performance.

The F1 interface 224a, 224b interconnects CU 221 and DUs 222, 223 within a gNB 220, e.g. as specified in 3GPP TS 38.401 V15.0.0 (2018-01). The corresponding F1 application protocol (F1AP) is specified in 3GPP TS 38.473 V15.0.0 (2017-12).

In 5G NR, centralized radio resource coordination or load balancing can be performed based on information exchange between gNBs, CUs and DUs. This can be applied via the X2 application protocol (X2AP), e.g. as specified in 3GPP TS 36.423 V15.0.0 (2017-12) and the XnAP respectively, e.g. as specified in TS 38.420 NR-RAN; Xn general aspects and principles, V0.7.0 (2018-03), TS 38.423 NR-RAN; Xn Application Protocol (XnAP), V0.7.0 (2018-03). This requires an RRM functionality/algorithm placed at a central entity which may be represented by either a master gNB or a CU. The master gNB may be one of the gNBs 210, 220 depicted in FIG. 2. The CU may be the CU 221 shown in FIG. 2. The gNB 210 may have the same structure as the gNB 220, i.e. including one CU 221 and one or more DUs 222, 223.

The first CU/DU split option that is specified by 3GPP introduces a split between PDCP and RLC layer, e.g. as described in Option 2 in Section 11.1.1 of 3GPP TR 38.801 V14.0.0 (2017-03). This means that PHY, MAC and RLC will be located in the DU (e.g. DU 222 or DU 223 in FIG. 2) while PDCP and SDAP plus RRC will be located in the CU 221, SDAP for the user plane protocol stack and RRC for the control plane protocol stack.

In order to support balancing or coordination under consideration of computational resource requirements between CUs and DUs for gNBs, e.g. in a telco environment comprising centralized and edge clouds, the F1 interface 224a, 224b as well as the Xn-C interface 111 may carry additional information about computational resource usage, such as for example CPU, memory, and network interface utilization.

An extension of the interfaces between DU and CU (i.e. F1 interfaces 224a, 224b but also Xn-C interfaces 111 between gNBs 210, 220) is provided for the consideration of computational resources in addition to traditionally considered radio resources as additional KPI. The utilization of such status reporting regarding the computational resource utilization of individual entities within the DU 222, 223 (e.g. PHY, MAC, etc.) can yield significant performance if combined with corresponding parameter adaptation algorithms within the CU 221.

For both LTE and NR, 3GPP has already specified bitmaps for exchanging resource block allocation patterns between eNBs and gNBs over the X2 interface 111 and between CU 221 and DUs 222, 223 over the new F1 interface 224a, 224b for supporting resource coordination methods, such as coordinated scheduling and interference coordination. The information elements for the Xn interface 111 are currently under discussion at 3GPP.

The definition of these bitmaps for the X2 interface 111 and the F1 interface 224a, 224b can, for example, be found in: TS 38.470 "F1 general aspects and principles"; TS 38.473 "NG-RAN F1 interface: F1AP specification"; TS 36.423 sub clause 9.2.117: "X2 application protocol (X2AP) →MeNB or SGNB Resource Coordination IE→Bit String 6 . . . 4400→N PRBs×SF bitmap (max 40 SF)" and TS 36.211: "definition of N PRBs". An extension of additional information elements for both F1 224a, 224b and Xn-C interface 111 regarding computational resource utilization according to the concept of this disclosure is described in the following.

As an example, the specification of resource coordination information can be found in 3GPP TS 36.423 in sub clause 9.2.117 describing SgNB Resource Coordination Information. The SgNB Resource Configuration Information IE is used at the MeNB to coordinate resource utilization between the en-gNB and the MeNB. Table 1 lists an example of information elements (IEs) addressing radio resource usage coordination between gNBs and/or eNBs.

TABLE 1

Information Elements (IEs) addressing radio resource usage coordination between gNBs and/or eNBs

| IE/Group Name | Presence | Range | IE Type and Reference | Semantics Description |
|---|---|---|---|---|
| NR CGI | M | | 9.2.111 | |
| UL Coordination Information | M | | BIT STRING (6 . . . 4400, . . . ) | Each position in the bitmap represents a PRB in a subframe; value "0" indicates "resource not intended to be used for transmission", value "1" indicates "resource intended to be used for transmission". Each position is applicable only in positions corresponding to UL subframes. The bit string may span across multiple contiguous subframes (maximum 40). The first position of the UL Coordination Information corresponds to the receiving node's subframe 0 in a receiving node's radio frame where SFN = 0. The length of the bit string is an integer multiple of $N_{RB}^{UL} \cdot N_{RB}^{UL}$ is defined in TS 36.211 [10]. The UL Coordination Information is continuously repeated. |
| DL Coordination Information | O | | BIT STRING (6 . . . 4400, . . . ) | Each position in the bitmap represents a PRB in a subframe; value "0" indicates "resource not intended to be used for transmission", value "1" indicates "resource intended to be used for transmission". Each position is applicable only in positions corresponding to DL subframes. The bit string may span across multiple contiguous subframes (maximum 40). The first position of the DL Coordination Information corresponds to the receiving node's subframe 0 in a receiving node's radio frame where SFN = 0. The length of the bit string is an integer multiple of $N_{RB}^{DL} \cdot N_{RB}^{DL}$ is defined in TS 36.211 [10]. The DL Coordination Information is continuously repeated. |

Based on the specified structure shown in Table 1, an exemplary embodiment for extending NG, F1 and Xn-C with additional information elements, regarding the consumption of computational resources according to the concept of the disclosure is presented below with respect to Table 2.

TABLE 2

Novel information elements for communication addressing computational resource utilization.

| IE/Group Name | Presence | Range | IE Type and Reference | Semantics Description |
|---|---|---|---|---|
| ID* | M | | | |
| CPU utilization information | M | | BIT STRING (4 . . . ) | Each bitstring combination represents a threshold related to the cpu utilization used by the gNB, CU/DU respectively. The length of the bit string is an integer defined based on the necessary amount of thresholds defined. |

TABLE 2-continued

Novel information elements for communication addressing computational resource utilization.

| IE/Group Name | Presence | Range | IE Type and Reference | Semantics Description |
|---|---|---|---|---|
| | | | | The CPU utilization information is continuously repeated. |
| Memory utilization information | M | | BIT STRING (4 . . . ) | Each bitstring combination represents a threshold related to the memory utilization used by the gNB, CU/DU respectively. The length of the bit string is an integer defined based on the necessary amount of thresholds defined. The memory utilization Information is continuously repeated. |
| Network interface utilization information | M | | BIT STRING (4 . . . ) | Each bitstring combination represents a threshold related to the network interface utilization used by the gNB, CU/DU respectively. The length of the bit string is an integer defined based on the necessary amount of thresholds defined. The network interface utilization Information is continuously repeated. |
| Storage utilization information | M | | BIT STRING (4 . . . ) | Each bitstring combination represents a threshold related to the storage utilization used by the gNB, CU/DU respectively. The length of the bit string is an integer defined based on the necessary amount of thresholds defined. The storage utilization Information is continuously repeated. |
| Measurement Time Window | M | | BIT STRING | The bitstring encodes a time window that has been used for the measurement of the computational resource utilization by the gNB, Cu/DU respectively. The values range from one TTI to N_max TTIs |
| Time Stamp | M | | BIT STRING | The bitstring encodes a time stamp that indicates the start of the time window that has been used for the measurement of the computational resource utilization by the gNB, Cu/DU respectively. The bitstring can encode an absolute time value in a synchronized radio access network, or a TTI number according to the numbering scheme TTI number ping scheme applied for 5G NR |

Note:
ID* may be either the NR Cell Global Identifier (NCGI), gNB-DU ID or gNB Identifier (gNB ID) dependent on the unit to send/receive the novel information elements (e.g. according to TS 38.300 sub clause 8.1, 8.2, TS 38.401 sub clause 6.2.1, 6.2.2).

The utilization information (for CPU, memory, network interface and storage) as depicted in table 2, may indicate a utilization (or workload) in percentage, e.g. in percent or fraction of a full utilization. Alternatively, a specific scale may be used, for example low utilization indicated by integers 1, 2, 3, medium utilization indicated by integers 4, 5, 6 and high utilization indicated by integers 7, 8, 9. Any other values constituting the scale are possible as well. The mapping of the measured values to the scale may be linear or non-linear, e.g. logarithmic. Alternatively a binary value may be provided, e.g. a zero for normal utilization and a one for an overload situation.

The utilization information may comprise a mean value measured over the measurement interval, i.e. the measurement time window as depicted in Table 2. To each measurement, a time stamp may be added, i.e. the Time Stamp as depicted in Table 2. The utilization information may further include statistical information, e.g. a variance of the measured utilization values over the measurement interval, or any other statistical evaluation.

Figure 3:
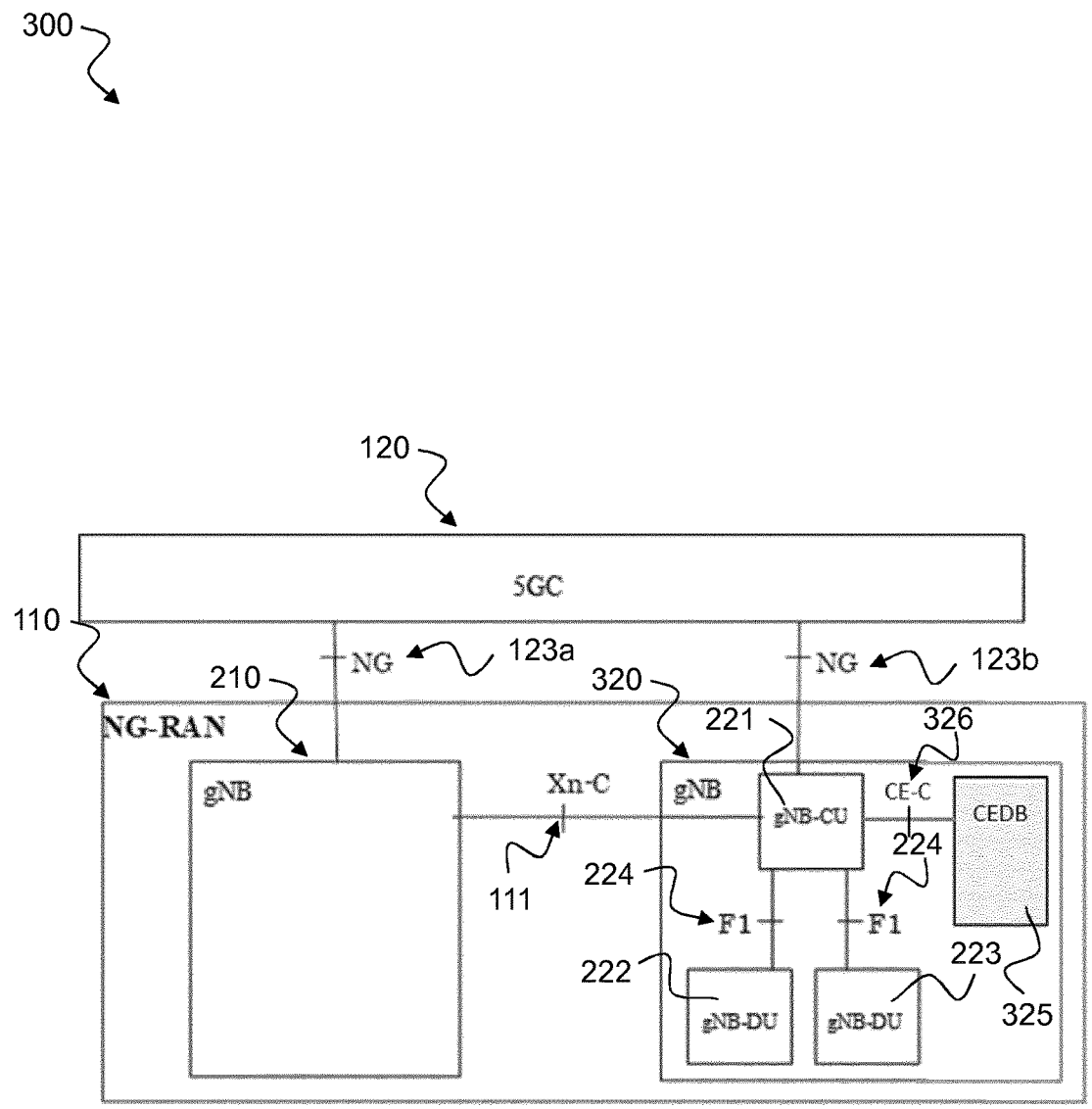
FIG. 3 shows an overall architecture of a 5G radio access network (RAN) 300 with an enhanced gNB 320 according to the disclosure.

The novel information elements can additionally be used for the communication with a data base as a virtual element for the computational resource utilization of individual functions within a gNB or eNB, e.g. as illustrated in FIG. 3.

FIG. 3 shows an overall architecture of a 5G radio access network (RAN) 300 with an enhanced gNB 320 according to the disclosure.

The novel information elements presented in Table 2 above can additionally be used for the communication with a data base 325 as a virtual element for the computational resource utilization of individual functions within a gNB 210, 320 or eNB, e.g. as illustrated in FIG. 2. The RAN 300 shown in FIG. 3 may correspond to the RAN 200 shown in FIG. 2 with the difference that an additional data base 325 with an interface 326 to the CU 221 and optionally further interfaces (not shown in FIG. 3) are included.

This computational elasticity data base (CEDB) 325 and the corresponding interfaces 326 to CU 221 within a gNB 320 are shown in FIG. 3. The interface (CE-C) 326 will facilitate the support of advanced control algorithms for computational elasticity via having a common data base 325 for all controlled entities (functions within CU 221 and DU 222, 223) and entities control the computational resource utilization of these controlled entities. Such a controller can for example be located in a CU 221 that controls the computational resource utilization of multiple DUs 222, 223 within the same gNB 320, e.g. as illustrated in FIG. 3. In an embodiment the computational resource utilization of multiple CUs and/DUs in different gNB can be controlled by a single computational resource master controller within the CU 221 of a master gNB. The CEDB 325 can furthermore be extended with additional interfaces that provide access to it for processes running outside the gNB 320 or eNB hosting the CEDB 325.

Entries in the CEDB 325 may comprise, for example:
gNB identifier (gNB-ID);
Location of that function within the NG-RAN (FN-LOC) (e.g. CU or DU);
Function identifier (FN-ID) (e.g. downlink resource allocation);
Time stamp;
Time window;
Current computational resource utilization of that function (FN-CRU) (e.g. CPU, memory, etc.).

The first three entries represent a unique identification of a specific CU or DU within the radio access network. The time stamp indicates for each entry when it has been updated last time, and the time window indicates the duration over which the computational resource utilization was measured. The third part indicates the computational resource utilization for the specific function with the indicated time window.

The communication over the interface between the CEDB 325 and the CU 221 may comprise at least the following exemplary commands:
SET_CEDB_ENTRY for writing an entire entry or parts of it into the CEDB 325;
GET_CEDB_ENTRY for reading an entire entry or parts of it from the CEDB 325.

For reading and writing, the entries are addressed by a tuple of identifiers such as for example gNB-ID and FN-ID. These commands may provide access to the information regarding a specific function in a specific gNB.

Making use of the information elements described in Table 2, the command for writing into the CEDB 325 (SET_CEDB_ENTRY) may comprise for example the following information elements:
ID;
CPU utilization information;
Measurement Time Window;
Time Stamp.

The feedback from the CEDB 325 answering a reading command (GET_CEDB_ENTRY) may correspondingly comprise the same information elements:
ID;
CPU utilization information;
Measurement Time Window;
Time Stamp.

In another option, the feedback can skip the information elements "Measurement Time Window" and "Time Stamp" if these are not required be the entity that conducts the request.

In other embodiment additional identifiers may be defined for gNB groups (gNB-GID) and identifiers for function groups within a gNB (FN-GID). These identifiers may be part of the CEDB entries and the corresponding addressing tuples for the interface commands. Each identifier field within the interface command should then reserve at least one value for addressing all entries within a group, e.g. all functions within a function group or all gNBs within a specific gNB group.

Figure 4:
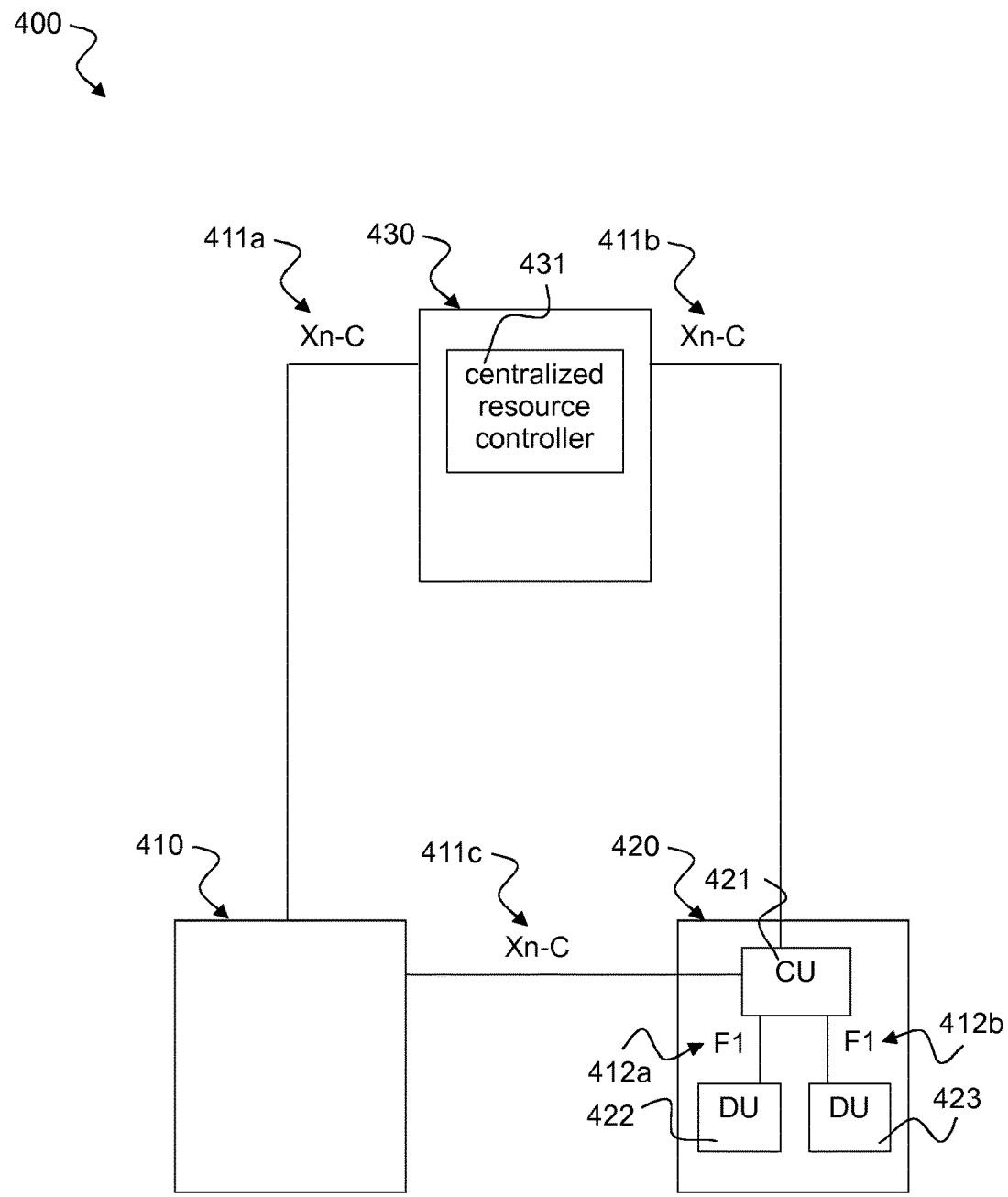
FIG. 4 shows a schematic diagram of a radio access system 400 according to the disclosure.

FIG. 4 shows a schematic diagram of a radio access system 400 according to the disclosure. The radio access system 400 may correspond to one of the RANs 200, 300 described above with respect to FIGS. 2 and 3.

The radio access system 400 includes a set of radio access entities 410, 420, 430, e.g. a set of gNBs 210, 220, 320 and/or ng-eNBs as described above with respect to FIGS. 1 to 3, which are interconnected via respective first interfaces 111, 411a, 411b, 411c, Xn-C. Each radio access entity of the set of radio access entities 410, 420, 430 comprises a centralized unit, CU 421, and at least one distributed unit, DU 422, 423, coupled to the CU 421 via a second interface 224a, 224b, 412a, 412b, F1.

The CU 421 may correspond to the CU 221 described above with respect to FIGS. 2 and 3. The DU 422, 423 may correspond to the DU 222, 223 described above with respect to FIGS. 2 and 3. The first interfaces 411a, 411b, 411c may correspond to Xn-C interfaces 111 as described above with respect to FIGS. 1 to 3. The second interfaces 412a, 412b may correspond to F1 interfaces 224a, 224b as described above with respect to FIGS. 1 to 3.

The radio access system 400 further includes a centralized resource controller 431 configured to assign computational resources to the CU 421 and the one or more DUs 422, 423 of the radio access entities 410, 420, 430 based on measurement reports received via the first interfaces 411a, 411b, 411c and/or the second interfaces 412a, 412b from the respective units. The measurement reports comprise information about a computational resource utilization of the respective units 421, 422, 423.

The measurement reports may include measurements of computational resource utilization taken over a specific measurement time window and may additionally include a time stamp of the measurement. As resource utilization of computational resources may change, the time window and the time stamp give an indication about the situation at a specific time and time interval for which the measurements were performed. The measurements may be performed by a CU or a DU measuring their own computational resources and reporting it to the centralized resource controller 431. A CU may collect measurement reports of DUs and/or other CUs and forward them to the centralized resource controller 431. The respective measurement reports may be collected by the CU and sent in an overall measurement report for various DUs, e.g. DUs of the corresponding CU.

The first interfaces 411a, 411b, 411c may be implemented as Xn-C interfaces between the gNBs and/or ng-eNBs according to a 5G Radio Access Network architecture, e.g. as shown in FIG. 1. The second interfaces 412a, 412b may be implemented as F1 interfaces between a respective CU 421 and corresponding DUs 422, 423 according to the 5G Radio Access Network architecture.

The centralized resource controller 431 may be placed at a master gNB or at one of the CUs 421 of the radio access system 400.

The CUs 421 and DUs 422, 423 may comprise respective measurement modules configured to measure the computational resource utilization of the respective units 421, 422, 423 and to transmit the measurement reports to the centralized resource controller 431.

The centralized resource controller 431 may be configured to perform radio resource coordination and/or load balancing based on the information about computational resource utilization comprised in the measurement reports.

The centralized resource controller 431 may be configured to perform X2 application protocol functions and/or Xn application protocol functions based on the information about computational resource utilization comprised in the measurement reports.

The measurement reports may be specified as bitmaps, e.g. according to the specification in 3GPP TS 36.423 in sub clause 9.2.117, comprising the following information elements: CPU utilization information, memory utilization information, network interface utilization information, and/or storage utilization information.

The measurement reports may comprise the following header information: unique identifier of reporting radio access entity 410, 420, 430, identifier or location of reporting CU 421 or DU 422, 423, identifier of function to which the computational resources are assigned, measurement time window, time stamp of measurement.

Each radio access entity of the set of radio access entities may comprise a computational elasticity data base, CEDB 325, e.g. as described above with respect to FIG. 3, that is coupled via a computational elasticity control, CE-C, interface 326 to the CU 421 of the respective radio access entity 420. The CEDB 325 provides a common data base for the computational resource utilization of the CU 421 and DUs 422, 423 of the respective radio access entity 410, 420, 430.

The CEDB 325 may be configured to store the measurement reports for the CU 421 and DUs 422, 423 of the respective radio access entity 420. The centralized resource controller 431 may be configured to assign the computational resources based on accessing the measurement reports from the CEDB 325.

The CU 421 of a radio access entity, e.g. 420 as shown in FIG. 4, may comprise a central Control Plane entity, CU-CP 511 and a central User Plane entity, CU-UP 521, e.g. as described below with respect to FIG. 5.

Figure 5:
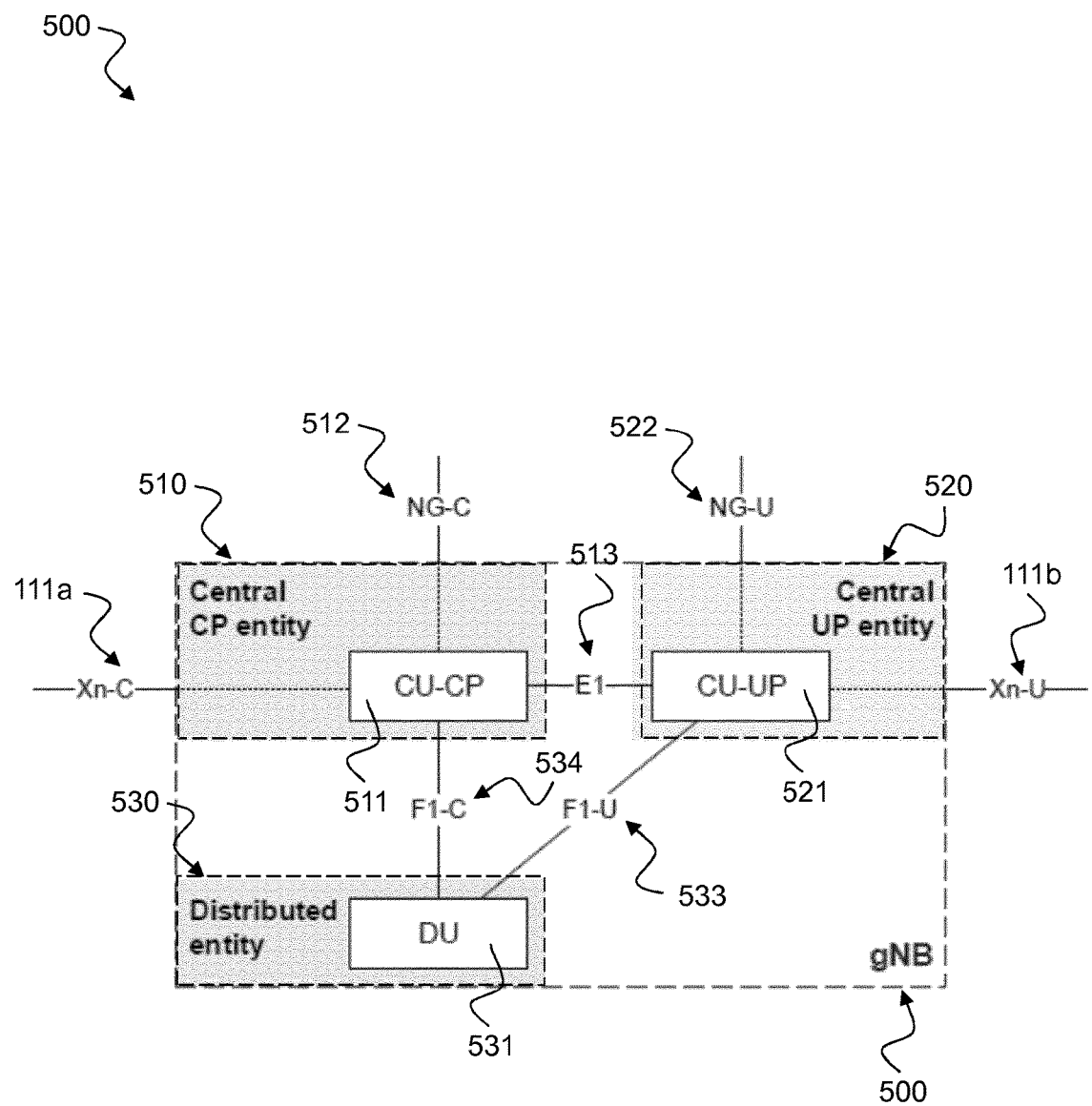
FIG. 5 shows a block diagram of a gNB in a first configuration 500 according to the disclosure.
Figure 6:
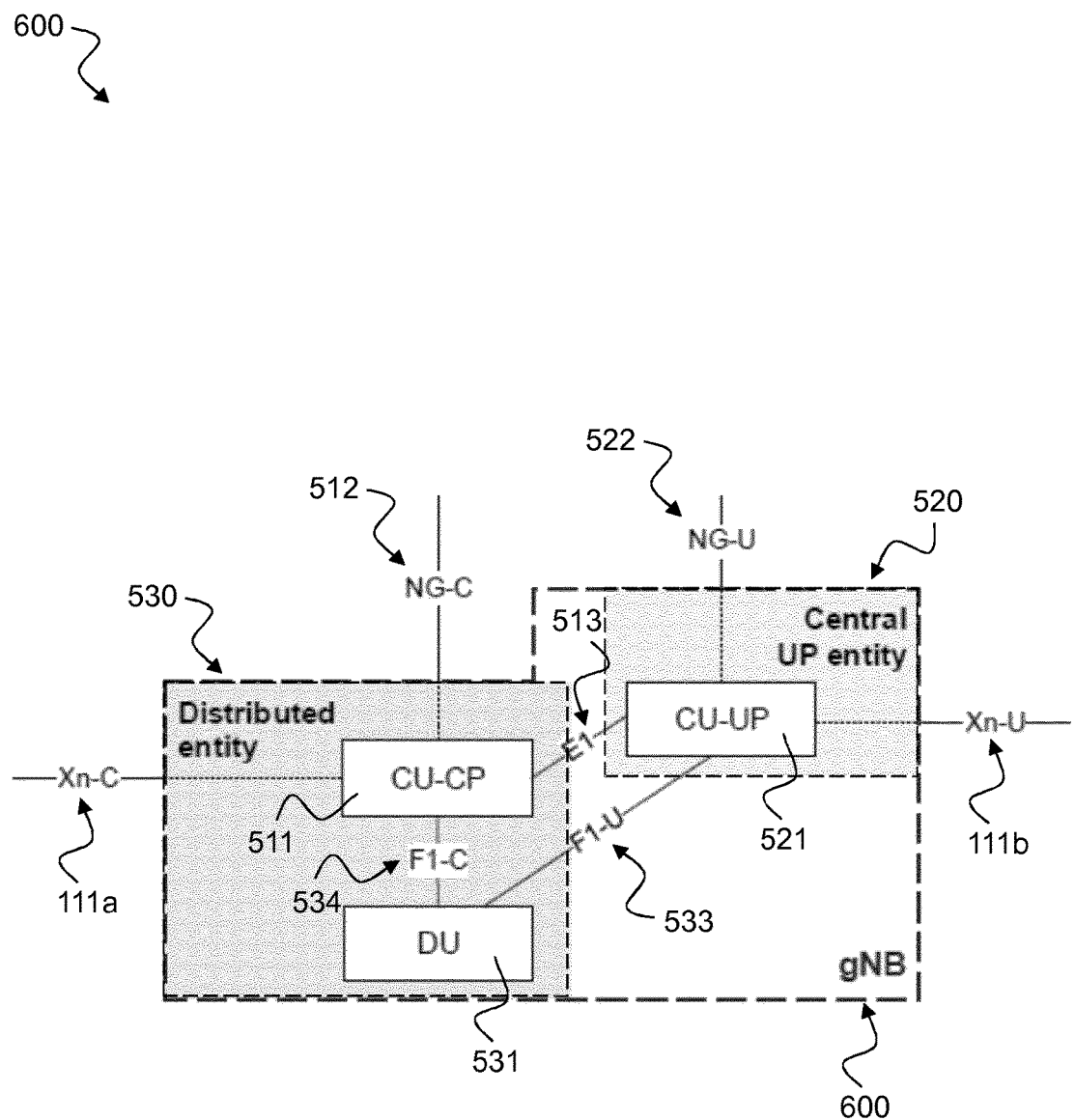
FIG. 6 shows a block diagram of a gNB in a second configuration 600 according to the disclosure.
Figure 7:
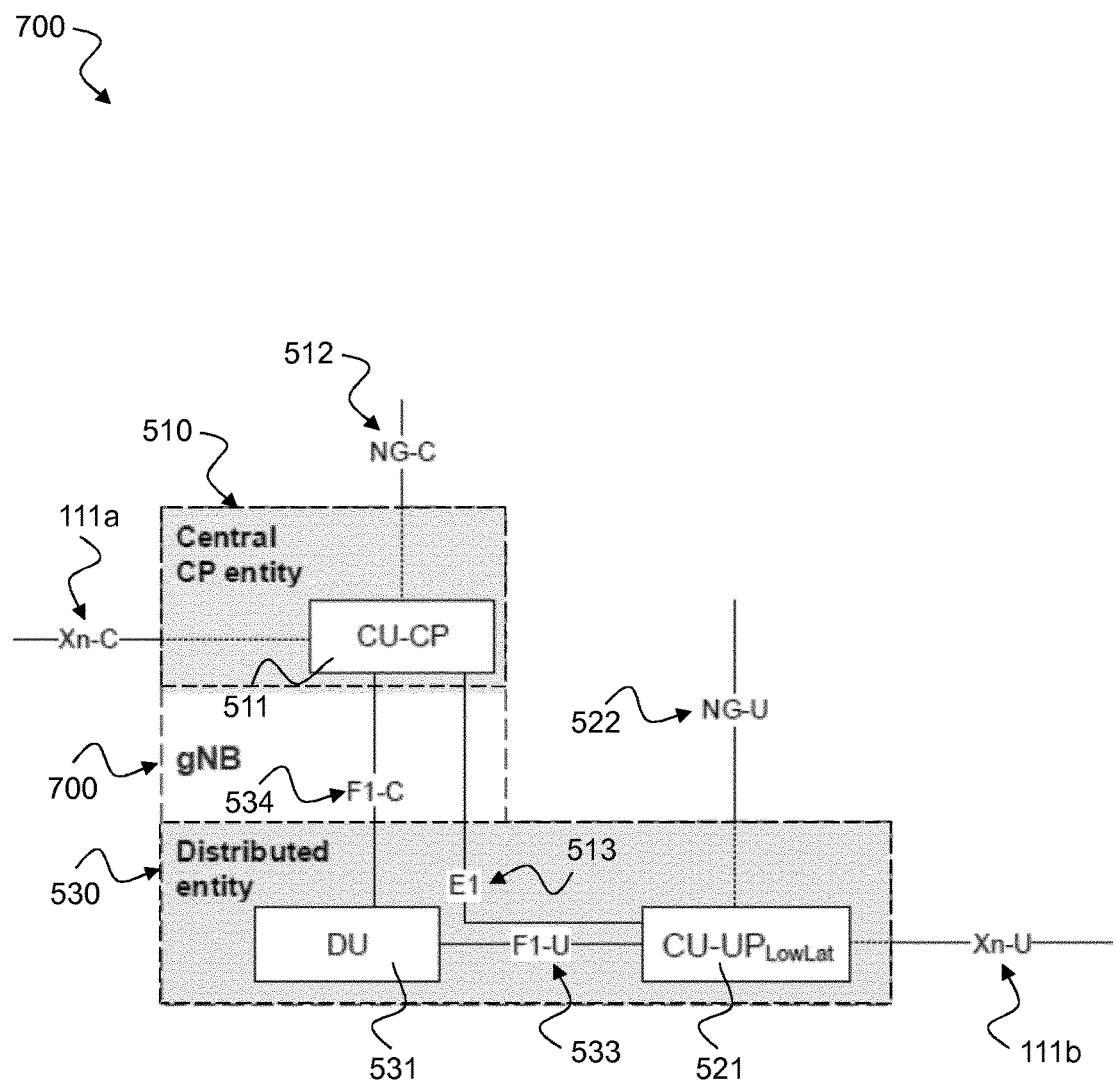
FIG. 7 shows a block diagram of a gNB in a third configuration 700 according to the disclosure.

The CU-CP 511 may be configured to receive the measurement reports from the CU-UP 521 and the at least one 422, 423, e.g. corresponding to the DU 531 described in FIGS. 5 to 7 and to forward the measurement reports via the first interface 411a, 411b, 411c.

In a first configuration of the radio access entity 500, e.g. as described below with respect to FIG. 5, the CU-CP 511 is centralized to coordinate operation of several DUs 531 of the radio access entity 500 and the CU-UP 521 is centralized to provide a central termination point for user plane traffic.

In a second configuration of the radio access entity 600, e.g. as described below with respect to FIG. 6, the CU-CP 511 is co-located with a DU 531 of the radio access entity 600 to supervise an operation of the DU 531 and the CU-UP 521 is centralized to provide a central termination point for user plane traffic.

In a third configuration of the radio access entity 700, e.g. as described below with respect to FIG. 7, the CU-CP 511 is centralized to coordinate operation of several DUs 531 of the radio access entity 700 and the CU-UP 521 is distributed and co-located with a single DU 531 of the radio access entity 700.

The centralized resource controller 431 may be configured to adjust a configuration of the radio access entity 410, 420, 430 to one of the first configuration 500, e.g. as described below with respect to FIG. 5, the second configuration 600, e.g. as described below with respect to FIG. 6, or the third configuration 700, e.g. as described below with respect to FIG. 7, based on the measurement reports.

FIGS. 5, 6 and 7 illustrate three exemplary scenarios for the separation of CU-CP (control plane instance of PDCP/RRC protocols) and CU-UP (the user plane instance of PDCP (and SDAP) protocols). The DU 531, CU-CP 511 and CU-UP 521 represent logical entities. The "Distributed entity", "Central UP entity" and "Central CP entity" represent entities which may be deployed at different physical sites. FIG. 5 represents the CU-CP and CU-UP centralized scenario (Scenario 1). FIG. 6 represents the CU-CP distributed and CU-UP centralized scenario (Scenario 2). FIG. 7 represents the CU-CP centralized and CU-UP distributed scenario (Scenario 3).

A centralized resource controller may adjust the gNB to a structure according to one of the three scenarios or configurations 500, 600, 700 shown in FIGS. 5 to 7. The adjusting may be based on measurements reports from the DU 531, CU-CP 511 and CU-UP 521 indicating their current computational resource utilization, e.g. as described above with respect to FIG. 4.

In an embodiment, the separation of the CU-CP (control plane instance of PDCP/RRC protocols) and the CU-UP (the user plane instance of PDCP (and SDAP) protocols) can be realized implementation dependent (i.e. no standardized interface required). In another embodiment, the separation of the CU-CP and the CU-UP can be achieved by a new interface i.e. standardization of a dedicated Application Protocols and Transport Network Layer. A standardized interface can facilitate multivendor scenario.

The separation of CU-CP and CU-UP that is common to all scenarios provides the following benefits:

Flexibility to operate and manage complex networks, supporting different network topologies, resources, and new service requirements;

Alignment with SDN concept that would result in a functional decomposition of the radio access, based on a partial de-coupled architecture, between user and control plane entities and on network abstractions;

For functions purely handling with CP or UP processes, independent scaling and realization for control and user plane functions operation;

Support of multi-vendor interoperability (e.g., CU-CP and CU-UP can be provided by different vendors).

The gNB deployment with separate CU-CP and CU-UP provides the possibility of optimizing the location of different RAN functions based on the scenario and desired performance. For example, the CU-CP can be placed in a location close to the DU to provide short latency for the critical CP procedures. The CU-UP can be centralized in a regional or national data center, thus favoring cloud implementation. An additional CU-UP can also be placed closer to the DU to provide a local termination point for URLLC traffic.

Support of radio resource isolation and improving resource utilization for network slicing. A slicing instance may cover a geographic area of several ten to several hundred of gNBs. Central RRM may provide slice-level isolation as well as improve resource utilization.

On the other hand, the separation of CU-CP and CU-UP introduces new logical nodes, which may make networking and topology more complicated, thus efforts on network maintenance may also increase. Furthermore, depending on the deployment scenarios and topology, control and user plane signaling messages and their delay between CU-CP and CU-UP may increase.

FIG. 5 shows a block diagram of a gNB in a first configuration 500 according to the disclosure. FIG. 5 represents Scenario 1, i.e., CU-CP and CU-UP centralized. This scenario represents the basic case for CU-DU split with dedicated CU-CP 511 and CU-UP 521 parts which may be located in one common or separated central entities. The CU-CP 511 is centralized to coordinate the operation of several DUs 531. The CU-UP 521 is centralized to provide a central termination point for UP traffic (over interfaces 522, 111b) in dual-connectivity (DC) configurations.

Centralized CU-CP provides efficient load balancing and radio coordination of several DUs. This scenario allows to take maximum advantage of cloud technologies because both the CU-CP and CU-UP can be implemented in a virtualized environment. For the case where both CU-CP and CU-UP are deployed within the same physical node(s), the signaling over the E1 interface 513 may be internal to the gNB 500 and will thus not flow over the transport network, thereby reducing load on the transport network.

FIG. 6 shows a block diagram of a gNB in a second configuration 600 according to the disclosure. FIG. 6 represents Scenario 2, i.e. CU-CP distributed and CU-UP centralized.

CU-CP 511 is deployed in a distributed manner and co-located with the DU 531. The CU-CP 511 supervises the operation of a single DU 531. The CU-UP 521 is centralized to provide a central termination point for UP traffic (over interfaces 522, 111b) in DC configurations. In this scenario, the latency of the control signaling toward the UE and F1-C signaling is reduced as the CU-CP 511 is co-located with the DU 531 (in the distributed entity 530).

This scenario allows to take advantage of cloud technologies for user plane functions while ensuring low latency for critical control plane procedures. E1 signaling between the local Control and the User Plane function can flow over the transport network, e.g., between the distributed entity and the data center. This scenario may introduce higher control plane latency for E1 interface compared to Scenario 1. The impact of the extra-latency depends on the characteristics of the transport network and can be limited by a careful network design and opportune transport network infrastructure.

FIG. 7 shows a block diagram of a gNB in a third configuration 700 according to the disclosure. FIG. 7 represents Scenario 3, i.e., CU-CP centralized and CU-UP distributed. CU-CP 511 is centralized to coordinate the operation of several DUs. The CU-UP 521 is distributed and co-located with a single DU 531.

Centralized CU-CP provides efficient load balancing and radio coordination of several DUs. This scenario also allows to take advantage of cloud technologies while ensuring low latency for user plane traffic, which is important for some applications (e.g., critical MTC). This scenario may introduce higher control plane latency compared to Scenario 1. The impact of the extra-latency depends on the characteristics of the transport network and can be limited by a careful network design and opportune transport network infrastructure.

Figure 8:
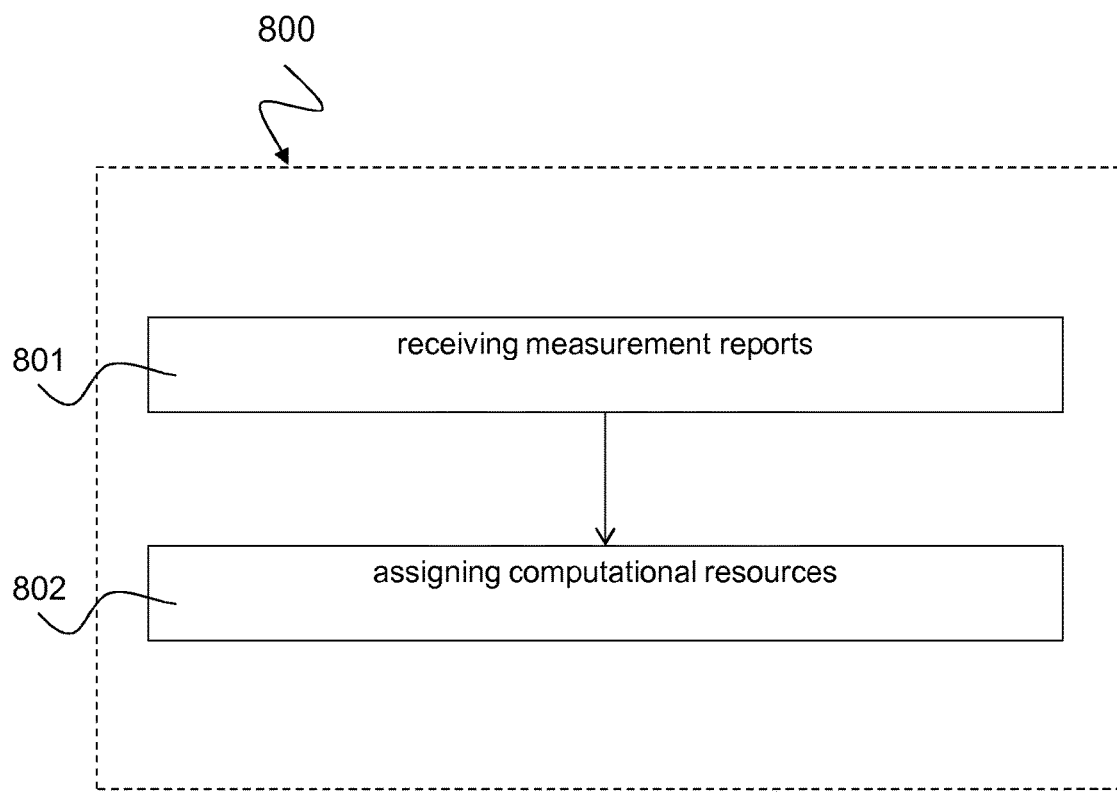
FIG. 8 shows a schematic diagram illustrating a method 800 for controlling computational resources of a radio access system according to the disclosure.

FIG. 8 shows a schematic diagram illustrating a method 800 for controlling computational resources of a radio access system according to the disclosure. The radio access system may be a radio access system 200, 300, 400 as described above with respect to FIGS. 2 to 7, comprising a set of radio access entities 410, 420, 430, in particular a set of gNBs 210, 220, 320 and/or ng-eNBs, which are interconnected via respective first interfaces 111, 411a, 411b, 411c, Xn-C. Each radio access entity of the set of radio access entities comprises a centralized unit, CU 221, 421, and at least one distributed unit, DU 222, 223, 422, 423, coupled to the CU 221, 421 via a second interface 224a, 224b, 412a, 412b, F1.

The method 800 includes: receiving 801 measurement reports via the first interfaces 111, 411a, 411b, 411c, Xn-C and/or the second interfaces 224a, 224b, 412a, 412b, F1 from the CU 221, 421 and the at least one DU 222, 223, 422, 423 of the radio access entities, wherein the measurement reports comprise information about a computational resource utilization of the respective units 221, 421, 222, 223, 422, 423.

The method 800 further includes: assigning 802 computational resources to the CU 221, 421 and the at least one DU 222, 223, 422, 423 of the radio access entities based on the measurement reports.

The method 800 may include further steps, such as, for example, according to the computing blocks described above with reference to FIGS. 2 to 7.

The method 800 may be implemented on a computer. Another aspect of the invention relates to a computer readable non-transitory medium on which computer instructions are stored which, when executed by a computer, cause the computer to perform the method 800.

Another aspect of the invention is related to a computer program product comprising program code for performing the method 800 or the functionalities described above, when executed on a computer or a processor. The method 800 may be implemented as program code that may be stored on a non-transitory computer medium. The computer program product may implement the techniques described above with respect to FIGS. 2 to 7.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A radio access system, comprising:
    a set of radio access entities, in particular a set of gNodeBs (gNBs) and/or next generation eNodeBs (ng-eNBs), which are interconnected via respective first interfaces, wherein each radio access entity of the set of radio access entities comprises a centralized unit (CU) and at least one distributed unit (DU) coupled to the CU via a second interface; and
    a centralized resource controller configured to assign computational resources to the CUs and the DUs of the radio access entities based on measurement reports received via the first interfaces and/or the second interfaces from the respective units, wherein the measurement reports comprise information about a computational resource utilization of the respective units;
    wherein each radio access entity of the set of radio access entities comprises a computational elasticity database (CEDB) coupled via a computational elasticity control (CE-C) interface to the CU of the respective radio access entity, the CEDB providing a common database for the computational resource utilization of the CU and the at least one DU of the respective radio access entity.

2. The radio access system of claim 1, wherein the first interfaces are implemented as Xn-C interfaces between the gNBs and/or ng-eNBs according to a 5G Radio Access Network architecture; and
    wherein the second interfaces are implemented as F1 interfaces between a respective CU and corresponding DUs according to the 5G Radio Access Network architecture.

3. The radio access system of claim 1, wherein the centralized resource controller is placed at a master gNB or at one of the CUs of the radio access system.

4. The radio access system of claim 1, wherein the CUs and DUs comprise respective measurement modules configured to measure the computational resource utilization of the respective units and to transmit the measurement reports to the centralized resource controller.

5. The radio access system of claim 1, wherein the centralized resource controller is configured to perform radio resource coordination and/or load balancing based on the information about computational resource utilization comprised in the measurement reports.

6. The radio access system of claim 1, wherein the centralized resource controller is configured to perform X2 application protocol functions and/or Xn application protocol functions based on the information about computational resource utilization comprised in the measurement reports.

7. The radio access system of claim 1, wherein the measurement reports are specified as bitmaps comprising the following information elements:
    CPU utilization information,
    memory utilization information,
    network interface utilization information, and
    storage utilization information.

8. The radio access system of claim 1, wherein the measurement reports comprise the following header information:
    unique identifier of reporting radio access entity,
    identifier or location of reporting CU or DU,
    identifier of function to which the computational resources are assigned,
    measurement time window, and
    time stamp of measurement.

9. The radio access system of claim 1, wherein the CEDB of a respective radio access entity is configured to store the measurement reports for the CU and the at least one DU of the respective radio access entity; and
    wherein the centralized resource controller is configured to assign the computational resources based on accessing the measurement reports from the CEDBs of the radio access entities.

10. The radio access system of claim 1, wherein the CU of a radio access entity comprises a central Control Plane entity (CU-CP) and a central User Plane entity (CU-UP).

11. The radio access system of claim 10, wherein the CU-CP is configured to receive the measurement reports from the CU-UP and the at least one DU and to forward the measurement reports via a first interface.

12. The radio access system of claim 10, wherein in a first configuration of the radio access entity, the CU-CP is centralized to coordinate operation of several DUs of the radio access entity and the CU-UP is centralized to provide a central termination point for user plane traffic;
    wherein in a second configuration of the radio access entity, the CU-CP is co-located with a DU of the radio access entity to supervise an operation of the DU and the CU-UP is centralized to provide a central termination point for user plane traffic; and
    wherein in a third configuration of the radio access entity, the CU-CP is centralized to coordinate operation of several DUs of the radio access entity and the CU-UP is distributed and co-located with a single DU of the radio access entity.

13. The radio access system of claim 12, wherein the centralized resource controller is configured to adjust a configuration of the radio access entity to one of the first configuration, the second configuration or the third configuration based on the measurement reports.

14. A method for controlling computational resources of a radio access system, comprising a set of radio access entities, in particular a set of gNodeBs (gNBs) and/or next generation eNodeBs (ng-eNBs), which are interconnected via respective first interfaces, wherein each radio access entity of the set of radio access entities comprises a centralized unit (CU) and at least one distributed unit (DU) coupled to the CU via a second interface, wherein the method comprises:
    receiving measurement reports via the first interfaces and/or the second interfaces from the CU and the DUs of the radio access entities, wherein the measurement reports comprise information about a computational resource utilization of the respective units; and assigning computational resources to the CUs and the DUs of the radio access entities based on the measurement reports;

wherein each radio access entity of the set of radio access entities comprises a computational elasticity database (CEDB) coupled via a computational elasticity control (CE-C) interface to the CU of the respective radio access entity, the CEDB providing a common database for the computational resource utilization of the CU and the at least one DU of the respective radio access entity.

15. A radio access system, comprising:

a set of radio access entities, in particular a set of gNodeBs (gNBs) and/or next generation eNodeBs (ng-eNBs), which are interconnected via respective first interfaces, wherein each radio access entity of the set of radio access entities comprises a centralized unit (CU) and at least one distributed unit (DU) coupled to the CU via a second interface; and a centralized resource controller configured to assign computational resources to the CUs and the DUs of the radio access entities based on measurement reports received via the first interfaces and/or the second interfaces from the respective units, wherein the measurement reports comprise information about a computational resource utilization of the respective units;

wherein the measurement reports are specified as bitmaps comprising the following information elements:

CPU utilization information, memory utilization information, network interface utilization information, and storage utilization information.

* * * * *